United States Patent Office 2,713,410
Patented July 19, 1955

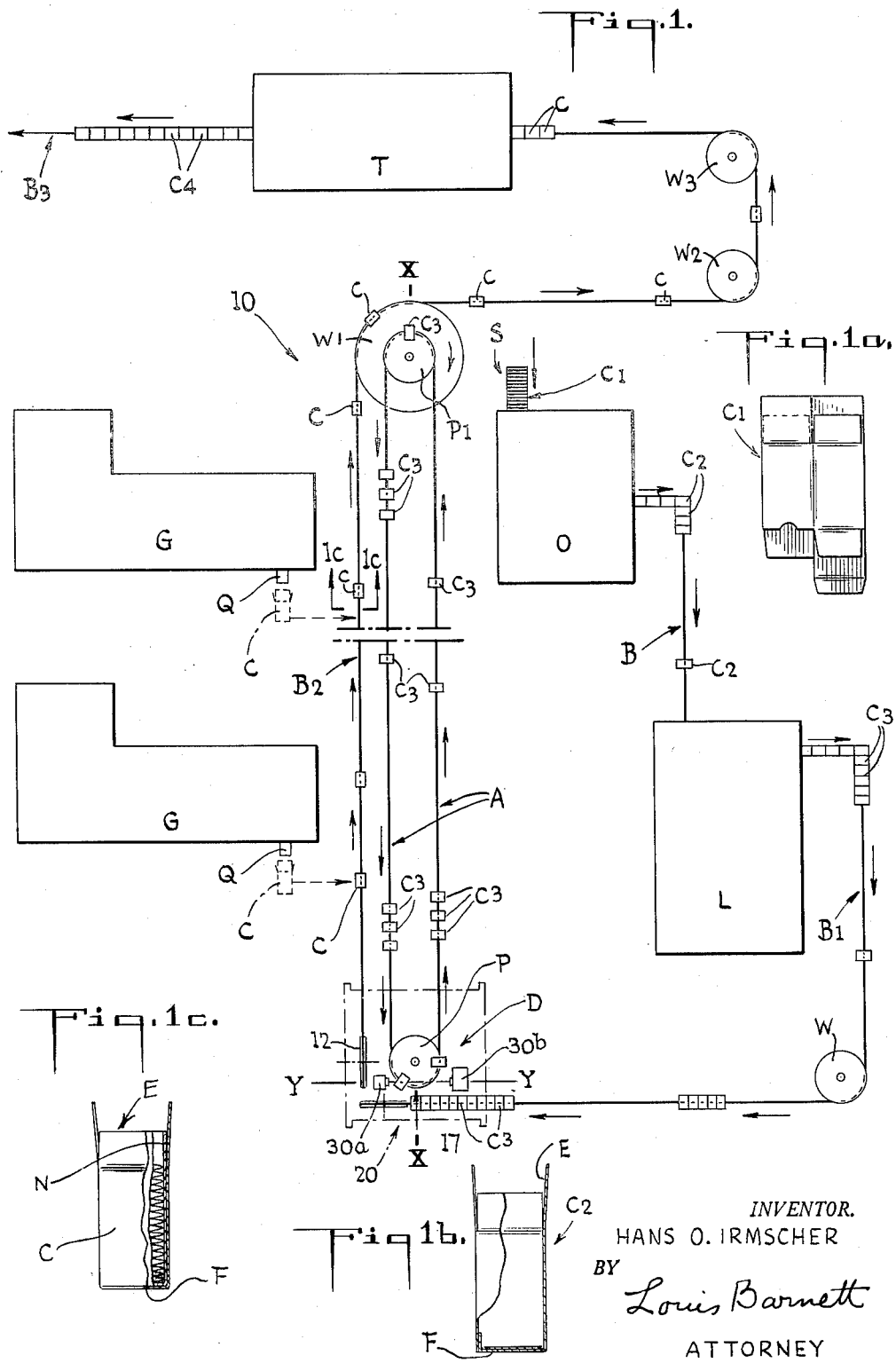

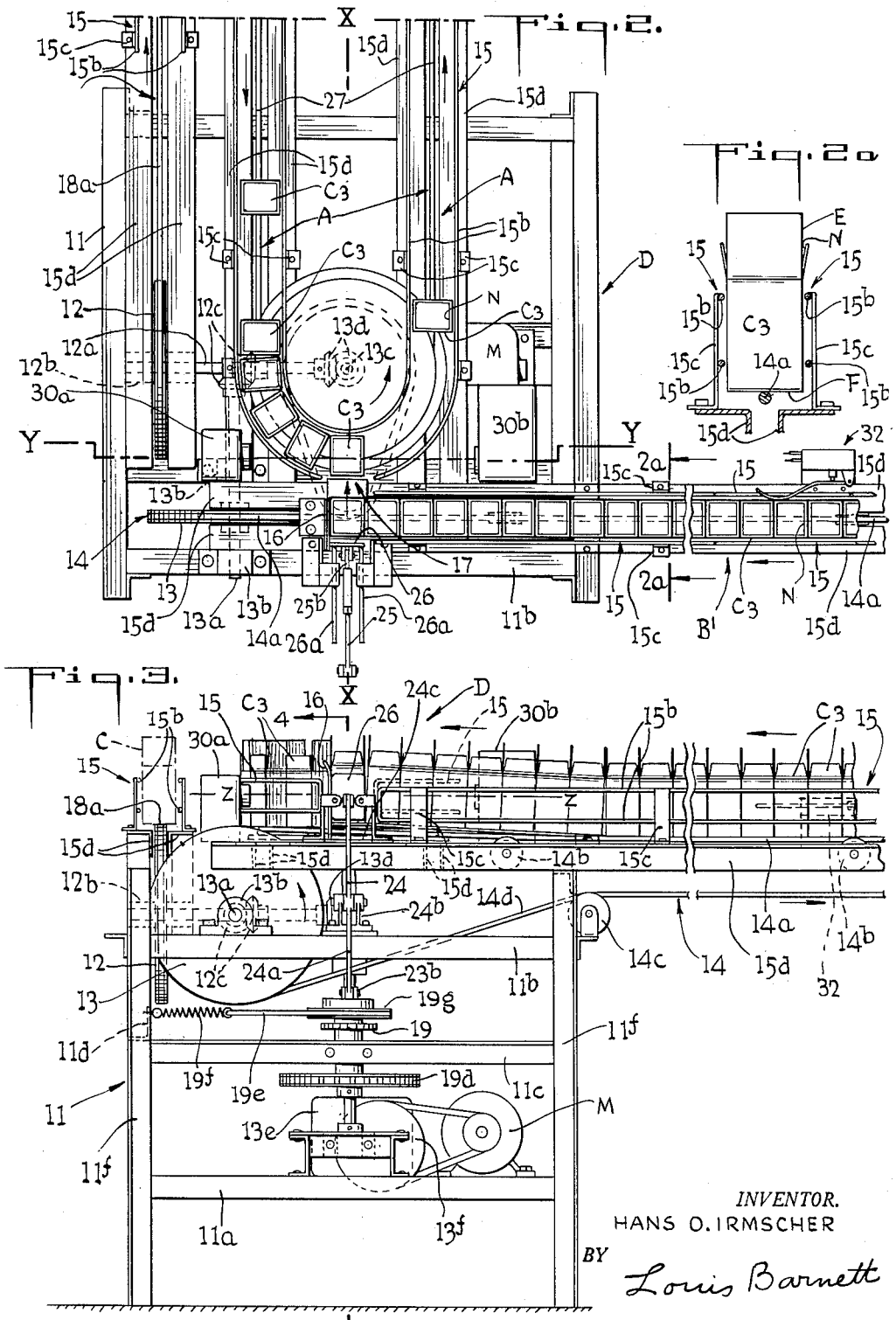

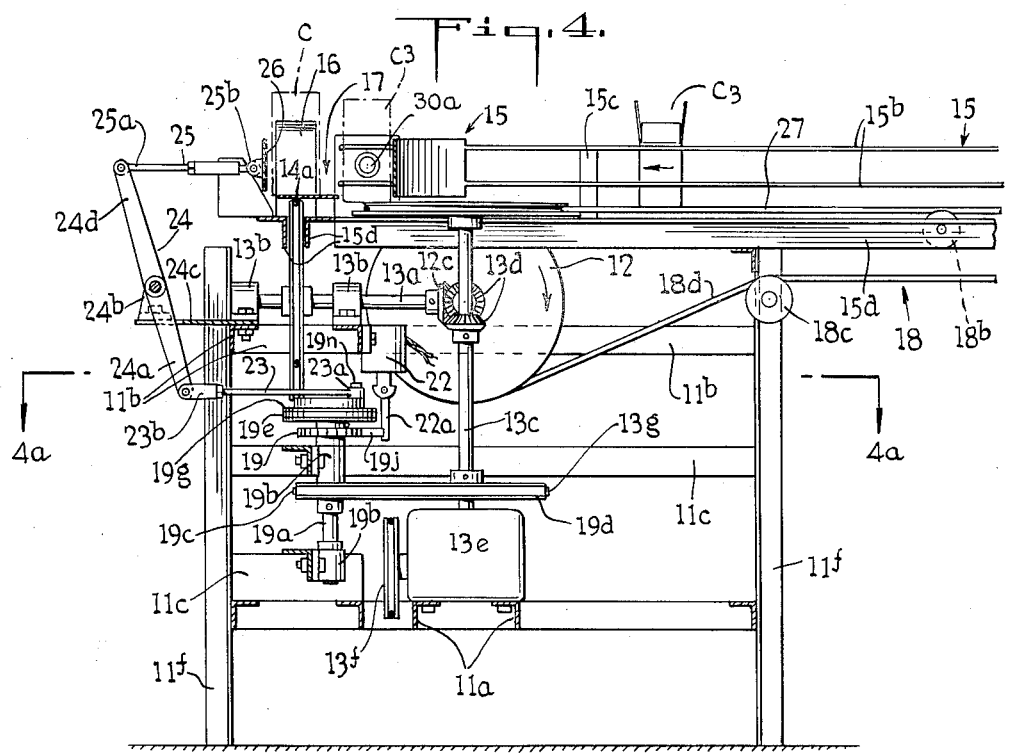

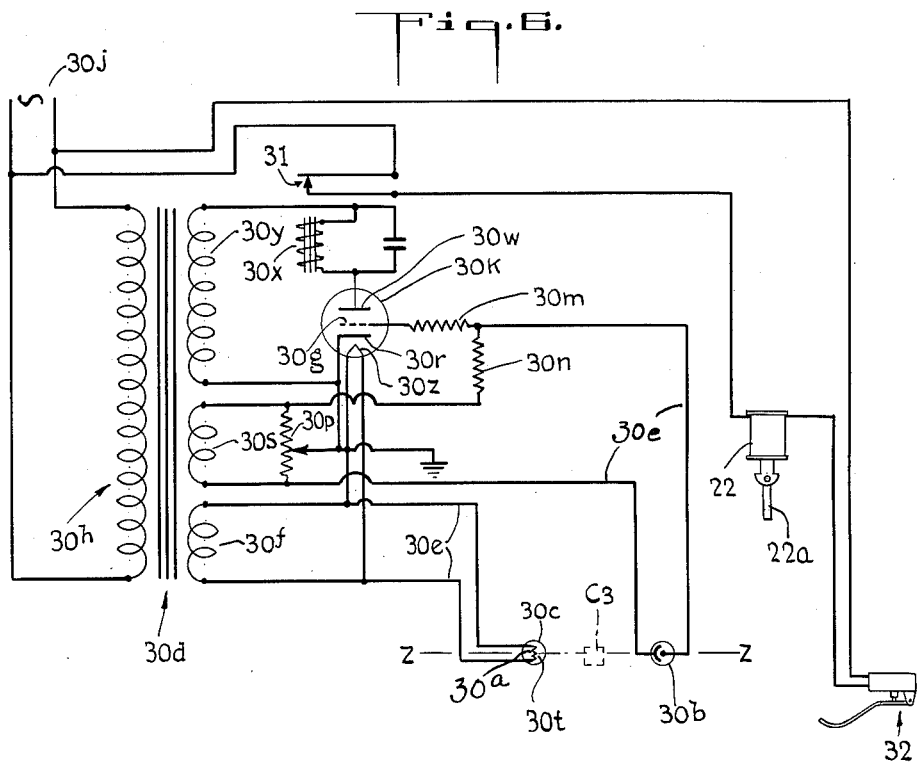
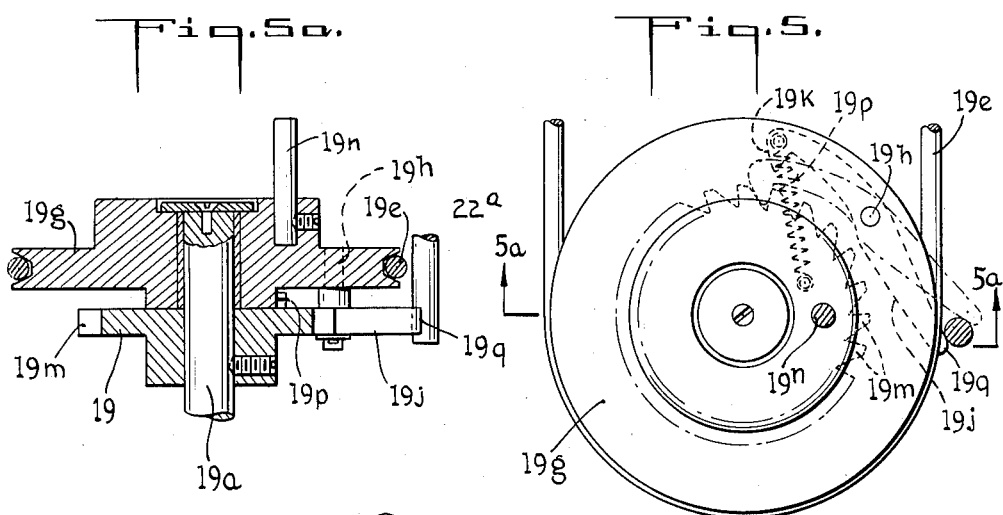
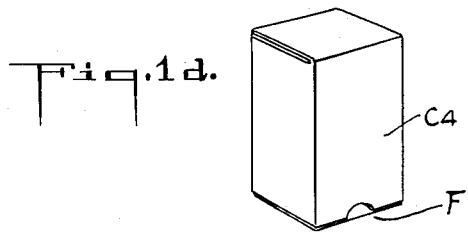

2,713,410

CONVEYOR AND TRANSFER SYSTEM WITH MONITORIZED CONTROL

Hans O. Irmscher, East Hempstead, N. Y., assignor to National Tea Packing Company, Inc., a corporation of New York Application December 12, 1949, Serial No. 132,446

6 Claims. (Cl. 198—21)

This invention relates to conveying or transfer installations for automatically regulating delivery of quantity cartons to conform to the discharge from high speed filled package manufacture ready for boxing and shipment, and an improved method therefor, for example, as including a monitorized mechanism operating to automatically regulate the transfer of empty cartons from a conveying bulk supply source to a conveyor station effective to limit the continuous delivery of empty cartons in spaced relation at a controlled rate for filling as required in handling tea balls manufactured on large scale production by an assembly-line like method.

Among the objects of the invention is to generally improve an automatically regulated conveying system and the operation thereof with a monitorized mechanism of the character described which shall be relatively simple and inexpensive to construct, which can be readily assembled, and easily operated with a minimum of expense, labor and skill, which shall be capable to serve and handle outputs of multiple super-high speed machines manufacturing infusion, or other like packages, which shall automatically control a conveying bulk empty carton supply to a conveyor station effective to deliver cartons at a rate corresponding to that being used in the cartoning operation for promoting mass production, and which shall be efficient and practical to a high degree in use.

The subject matter of this application is a continuation in part of my invention shown and described in copending application Ser. No. 35,373, filed June 28, 1948, now Patent No. 2,577,765, granted December 11, 1951.

Other objects of this invention will in part be obvious and in part hereinafter pointed out.

The invention accordingly consists in steps of the method of regulating said manufacture and features of construction, combination of elements and arrangement of parts which will be exemplified in the method and construction hereinafter described and of which the scope of application will be indicated in the following claims.

Fig. 1 is a diagrammatical plan view of a conveying transfer installation system for automatically controlling the delivery for quantity production of filled cartons from the manufactured deliveries of a plurality of automatic high speed package machines constructed to embody the invention as applied for example to tea ball outputs of large scale production by an assembly-line like method.

Fig. 1a is a view of a folded carton in the form as supplied to system at supply source station shown in Fig. 1.

Fig. 1b is an elevational view of the carton, partly broken away to expose the interior after being unfolded and set upright with an open upper end after leaving tucked-in closure station shown in Fig. 1.

Fig. 1c is an elevational view of a filled lined carton, partly broken away to show the contents, corresponding to that seen on line 1c—1c in Fig. 1 before tamping and sealing.

Fig. 1d is a perspective view of the filled lined carton with the contents sealed-in, as delivered for shipping as shown in Fig. 1.

Fig. 2 is an enlarged fragmentary plan view of the detail construction of the end of the empty lined carton feeding end of the conveyor means and the receiving end of the endless conveyor installation including the monitorizing mechanism at station shown in Fig. 1.

Fig. 3 is an end elevation of the head end conveyor constructions shown in Fig. 2.

Figs. 4 and 4a are vertical and horizontal sectional views corresponding to a cut taken on lines 4—4 in Fig. 3 and line 4a—4a in Fig. 4, respectively, showing details of the power and drive transmission.

Figs. 5 and 5a are plan and cross-sectional views, respectively, of fragmentary portions of the clutch control of the motorized mechanism, Fig. 5a being a section taken on lines 5a—5a in Fig. 5, and Fig. 6 is a wiring diagram of the "electric-eye" circuit portion of the monitorizing mechanism.

Referring in detail to the drawing, 10 denotes a conveying or transfer installation for automatically regulating conveyor delivery of quantity packaged articles, each of the latter here shown in Fig. 1c before final closure sealing may be a filled carton C, having a suitable inserted liner N and a top open end E after being packed from delivery output Q of one or more high-speed infusion package manufacture machines G, such for example, as described and shown in my Patent No. 2,475,617, granted July 12, 1949, said machine G each being capable of producing in excess of 200 tea-balls a minute and operating in said installation 10 on large scale production of multiple number of machine G outputs.

Said installation 10 may comprise a consecutive series of interconnected stations, for example, as diagrammatically shown in Fig. 1, to include a supply source S of flat folded cartons C1 which pass in a path indicated by directional arrows to a carton opener and tucked-in end closure station O of any well understood construction. From station O empty open or erected, that is, unfolded cartons C2 each with a suitable tucked-in end closure F in a bottom position and top open end E are successively moved on suitable belt conveying means B to box liner inserting station L which also is of any well understood construction. Where each empty carton C2 is furnished with an inner sheet closure or bag liner N, a mid-portion of which provides an unbroken seal positioned against said tucked-in end closure F of the carton C3 or C4.

From station L empty lined cartons C3 are successively advanced on suitable belt conveying means B1, which when required to change directions from a straightway, as in the arrangement shown in Fig. 1, may include a directional changing pulley W for advancing the empty lined cartons C3 along a path in an angular relation to terminal station D having monitorized control mechanism 20 thereat.

At station D the empty lined cartons C3 are automatically transferred in uniform spaced relation by monitorized mechanism 20 from conveyor means B1 to an elongated endless belt conveyor A having spaced apart pulley P and P1 of suitable construction around which the empty lined cartons C3 travel after being transferred by said mechanism 20 to conveniently supply the requirement of operator or operators stationed at each output end Q of machines G for manual filling said lined cartons C3. To that end, as is clear from Fig. 1, conveyor A is positioned and is extended to supply said cartons C3 within easy reach of each operator at said machine output ends Q, empty lined cartons C3 being continuously carried by conveyor A, manually removed therefrom and positioned as shown in dotted lines at said machine output ends Q where said cartons are filled with a predetermined counted number of individual infusion packages, for example, in the manner described in my said copending Ser. No. 35,373. Other empty lined cartons C3 are automatically transferred as required at said station D by monitorized mechanism 20 from conveying means B1 to conveyor A as will hereinafter more fully be described.

Filled unsealed cartons C are then manually placed by the operators on a suitable conveying means B2 positioned to extend a spaced distance along conveyor A as shown in Fig. 1. Said conveying means B2 include a pulley W1 which may be mounted to rotate on same shaft with pulley P1 of conveyor A for directing said filled cartons C placed on conveying means B2 to advance in relatively angular directional path to a contents package tamping and top sealing station T.

Where further intermediate change of angular directional path of advance travel of cartons C is required because of the relative position of said station T with respect to conveying means B2, other suitable spaced pulley W2, W3 may be provided as is clear from the Fig. 1 layout.

Detailed description of the operation and construction of said contents article tamping and top sealing station T for applying closures to carton ends E is shown in my copending application Ser. No. 140,606, filed January 26, 1950, and now Patent No. 2,669,813.

Carton opener and tucked-in end closure station O and of the box liner inserting station L, positioned as stated above, may each be of any conventional construction operating in the well understood manner to provide empty lined carton C3.

From station T the closed, sealed cartons C4 are removed for boxing and shipment by any suitable means as for example suitable conveying means B3.

One feature of the invention is the provision of the improved mechanical and electrical operated monitorized mechanism 20 as incorporated at station D that automatically transfers the empty lined carton C3 received from conveying means B1, to conveyor A in proper timed relation, said carton C3 being then made available for removed filling with infusion packages at machine output end Q, and thereafter replaced as filled cartons C on conveying means B2 for delivery through station T, as sealed carton C4 ready for boxing and shipment on conveyor means B3.

The advance movement of cartons C3 on upper level belt portion 14a of belt 14 forming part of said conveying means B1 may be barred by a suitable means, such as, a relatively fixed barrier guide bumper or stop 16 extending across the path of said movement just beyond ends 15a of fences 15, which guide cartons C3 on conveying means B1. The distance between said fence end 15a and the stop 16 forms a slideway 17 of slightly greater width than the dimensional length of carton C3 in the direction of the advancing movement thereof so that each leading carton C3 is carried in the direction of the arrow shown in Fig. 1 by said belt portion 14a and against stop 16 on rotation of head pulley 13 of conveyor means B1. Said leading carton C3 then will be in position clear of fences 15 and aligningly lodged in slideway 17 between said fence ends 15a against guide stop 16, ready to be transferred from conveying means B1 to conveyor A, as shown in Figs. 2, 3 and 4.

Shaft 13a of pulley 13 may be driven through a suitable power transmission, such as vertically disposed countershaft 13c interconnected with shaft 13a through bevel gears 13d, and cross shaft 12a having bevel gearing 12c as seen in Figs. 2 and 3, shaft 13c through suitable speed-reduction means 13e, and belted pulley 13f being connected for operation with an electric motor M. Said speed-reduction means 13e may be of any well understood construction and as shown in Figs. 3 and 4, is mounted on low-slung cross horizontally extending bars 11a forming frame 11.

Through said horizontally disposed cross-shaft 12a which is mounted in bearings 12b and supported on upper horizontally extending cross member 11b of frame 11, head grooved pulley 12 of conveyor means B2 is driven. An upper level belt portion 18a of belt 18 on pulley 12 of said conveyor means B2 on which filled open end cartons C are moved to station T when placed thereon by the operators, is provided to extend along side conveyor A as is clear from Figs. 1, 2, 3 and 4.

As seen in Figs. 2, 4 and 4a, there may be mounted in spaced apart bearings 19b adjacent speed reduction-means 13e on spaced horizontal bar 11c of frame 11, a vertical shaft 19a which has mounted to turn therewith in an overhanging relation to the upper end of said bearing 19b, a wheel ratchet 19, and also has fixedly mounted to shaft 19a between said bearings 19b, a sprocket 19c driven through chain 19d from sprocket wheel 13g, the latter being carried to turn with said counter-shaft 13c.

Monitorized mechanism 20 which is incorporated in station D so far described above and which may include besides said wheel ratchet 19, a suitable braking or drag means, such as strap 19e held under tension by spring 19f, said strap 19e and spring 19f being anchored to angle iron 11d of frame cross brace 11e adjacent to frame upright 11f. Strap 19e is extended to ride in a peripheral groove of drum wheel 19g which is mounted to turn on shaft 19a above said ratchet 19. Said drum wheel 19g carries to extend down therefrom a pivot pin 19h on which pawl 19j swings in position for engaging claw end 19k thereof wtih teeth 19m of said ratchet 19. A tension spring 19p may be provided to constantly urge said claw end 19k to cooperate with said ratchet teeth 19m.

Extending up from drum wheel 19g there is provided bearing pin 19n on which pivoted end 23a of horizontally disposed, length-adjustable, push and pull link 23 swings, as is shown in Figs. 3, 4, 4a, 5 and 5a.

The wheel ratchet 19 and drum wheel 19g construction above described and as shown in detail in Figs. 4, 5 and 5a form a one-revolution type of clutch which is actuated through an electrical operated solenoid 22, the latter having a depending stop pin 22a which is made effective to engage the free end 19q of pawl 19j. Solenoid 22 may be of any well understood detailed construction for operating in the manner hereinafter described to make pivoted end 23a of said push and pull link 23 reciprocate by turning of said ratchet wheel 19 with drum wheel 19g when solenoid 22 is energized.

End 23b of said link 23 opposite said link end 23a is pivotally connected to a downwardly extending arm 24a of bell-crank 24 which is mounted to swing on bearing 24b supported on horizontal extension bar 24c from frame 11 as shown in Fig. 4. Arm 24d of bell crank 24 which extends upwardly may pivotally connect with one end 25a of a horizontally extending, length-adjustable, thrust bar 25. The other end 25b of thrust bar 25, opposite end 25a may terminate with a joint fitting 25b for pusher plate 26 with guide rod 26a, said plate 26 being disposed vertically for contacting upright wall of empty carton C3 during the transfer movement thereof from conveyor means B1 to conveyor A or slideway 17 at station D, pusher plate 26 being positioned, guided, and actuated to be intermittently projected into and retracted from slideway 17 on each operation of said one-revolution clutch through the interconnecting linkages above described and shown in Figs. 2, 3 and 4.

As seen from Figs. 1, 2 and 4, axes of pulley P and P1 lie in a central plane X—X in alignment with slideway 17. Across the path of slideway 17 where the latter intersects the direction of travel path of conveyor A, that is, substantial in a plane Y—Y at right angle to plane X—X and approximately in tangential relation to the curvature of belt portion 27a of conveyor A which passes about the grooved periphery of pulley P at station D end of conveyor A, a so-called "electric eye" comprising light source 30a and companion light beam receiving photo-electric cell 30b is mounted. The light beams from said source 30a are intercepted on the passage of empty cartons C3 when spaced apart on conveyor A a distance insufficient to permit free transfer of another carton C3 from conveyor means B1 to conveyor A by monitorized mechanism 20.

Light source 30a, photo-electric cell 30b may be of any conventional construction and may be connected to an available electric power source connection 30j in the well understood manner. As is clear for the diagrammatic circuit shown in Fig. 6, light source 30a may include a suitable filament lamp 30c housed in a conventionally constructed casing to direct light beams therefrom in the direction of line Z—Z with cell 30b as a target. Lamp 30c is connected in circuit through wiring 30e to receive power from a section of a secondary portion 30f of a transformer 30d, the primary 30h of which connects with power source 30j in the well understood manner.

Light beams from lamp 30c projecting in the direction along lines Z—Z transverse the path of movement of cartons C3 on conveyor A, are received and continuously effect cell 30b except when one or more cartons C3 on conveyor A enters and remains in the field of said light beams along the direction of said line Z—Z to intercept same.

Photo-cell 30b which serves as the target to register changes in the light beam projection from lamp 30c of cell 30b through wiring 30 may be connected in circuit with a suitable electronic tube 30k of conventional construction available for the purposes herein described with a suitable series resistance 30m, a shunt resistance 30n and an adjustable potentiometer 30p. Said series resistance 30m may be connected to grid 30g of tube 30k and potentiometer 30p with plate 30r and energized from secondary portion 30s of transformer 30d as is clear from Fig. 6.

Tube filament 30z may be connected for operation from transformer secondary portion 30f. Another plate 30w may be provided in tube 30k connected with a relay 30x and another transformer secondary portion 30y, a suitable grounding and condenser being included in circuit as shown in Fig. 6 in a conventional manner.

Relay 30x may be installed to cooperate with make-and-break switch contacts 31 connected in circuit with solenoid 22 and stop switch 32.

Fences 15 may be constructed of guide wire strands 15b strung on spaced posts 15c that upstand on channels 15d that extend along opposite sides of upper level belt portion 14a and 18a for confining the movement of cartons C3 in upstanding position with said belt portion 14a and 18a as is clear from Figs. 1a, 2, 2a, 3 and 4. Belt 14 and 18 may also be provided with suitable idler level retaining rollers 14b and 18b for upper belt portion 14a and 18d respectively and slack take-up rollers 14c and 18c on underside portion 14d and 18d of belt 14 and 18 respectively as required, said rollers 14b and 18b and 14c and 18c being supported from channels 15d and one of frame uprights 11f as shown in Figs. 4 and 7.

Similarly constructed fences 15 with wire strands 15b strung on spaced posts 15c that upstand on channels 15d may be extended along opposite sides of effective conveying belt portions of conveyor means B2 of belt 18 and belt 27 of conveyor A, and also for like belt drives in the constructions of conveyor means B, B1 and B4, said fence constructions being provided as required, as for example, as shown in Figs. 2 and 2a.

After construction and installating apparatus as shown in the drawing and described above the practical utility of the invention will become apparent.

With conveyor means B1, B2 and conveyor A in operation driven by motor M to advance empty lined cartons C3 and filled cartons C, and conveyor means B operating from either station O or L for advancing said set-up cartons C2, all as indicated by the arrows in Fig. 1, and with stations O and L in effective operation, flat unfolded cartons C1 are successively supplied at station S. After said cartons C1 each passes through station O where it is unfolded, setup and has the tucked-in end closure F provided for empty carton C2, said cartons C2 being then successively advanced by conveyor means B to pass through station L where they are lined to provide empty lined cartons C3 and advanced by conveyor means B1 to station D, and to monitorized mechanism 20.

At station D, the leading empty lined carton C3 on conveyor means B1 is moved up against barrier bumper or stop 16 and those cartons C3 following are brought consecutively into abutment for automatic regulations by mechanism 20 as is clear from Figs. 1 and 3. With motor M, the "electric eye" and solenoid 22 connected in circuit to a suitable electric power supply source, shown diagrammatically in Fig. 6, at any time period when there is no obstruction to the passage or interception of light beams along line Z—Z from the light source 30a to photo-electric cell 30b, that is, when no carton C3 is being carried on conveyer A, thereat, the solenoid 22 will be energized to make one-revolution clutch effective for reciprocating push and pull link 23 to extend and retract the latter and swing bell crank 24 by raising stop pin 22a of the solenoid 22 up free from the path of rotation of free end 19q of pawl 19j to allow claw end 19k thereof pressed by spring 19p to effectively engage ratchet teeth 19m, and turn drum 19g with rotating of ratchet wheel 19 and shaft 19a one revolution. Stop pin 22a may then drop down into the path of rotation of said pawl free end 19q should solenoid 22 fail to be energized thereby again permitting stop pin 22a to strike pawl end 19q for swinging pawl claw end 19k to ride over said teeth 19m against the action of spring 19p. The frictional drag provided by strap 19e on wheel drum 19g, retains the latter against rotation stopping the reciprocation of push and pull link 23 when said stop pin 22a drops and claw end 19k again rides over ratchet wheel teeth 19m.

However should no carton C3 intercept said light beam along line Z—Z, the solenoid 22 will continue to be energized and said clutch function to turn plate 19 with pin 19n thereof to turn and reciprocate link 23 for extending and retracting same to swing bell-crank 24, and project pusher plate 26 with thrust bar 25 along slideway 17 thereby slidingly transferring said leading carton C3 from its resting position against upper level belt portion 14a of conveying means B1 onto belt 27 and pulley P of conveyor A, where said carton C3 is advanced with said belt 27 of conveyor A in the direction of the arrow shown in Fig. 1, by said regulation operation of said monitorized mechanism 20. A short inclined ramp may be provided on a slideway 17 for the leading carton C3 to slghtly separate the same from that following, as is clear from Fig. 3.

All of said cartons C3 which are transferred at spaced intervals along belt 27 of conveyor A by said operation of mechanism 20 continue the advance movement thereof in the endless path provided by conveyor A and are successively brought within easy reach of operators at machine output ends Q, as is clear from Fig. 1. Such operators therefore have available at all time a convenient supply of empty lined cartons C3 which are removed from conveyor A as selectively required. Those cartons C3 not selected and not removed continue to be carried on the conveyor A until they are again and again made available by being moved within said easy reach, those cartons C3 removed being automatically replaced and regulated by the operation of monitorized mechanism 20, as described above.

The selected cartons C3 that are removed from conveyor A by the operators are each filled with a predetermined number of articles, as for example, complete teaballs manufactured by each machine G and delivered at outlet end Q thereof.

Each filled carton C is then returned by the operator to conveyor means B2 which advance the same to station T where the contents of said carton C are tamped down, and the lining N and open end E sealed to form carton C4. On leaving station T filled and sealed cartons C4 are forwarded by conveyor means B3 for boxing and shipment in the well understood manner.

There is thus provided an assembly-line like method and a conveying and transferring installation of the character described having a capacity sufficient to automatically service machine outputs of production on largest and improved scale.

In order to better regulate and control the operation of the installation and more particularly to facilitate keeping a desired supply of cartons C3 on conveying means B at station D, a suitable switch 32 may be provided a spaced distance from slideway 17 on conveying means B1, as shown in Figs. 2 and 3. Said switch 32 as shown in Fig. 6 is connected in circuit with solenoid 22 and extends for operation into the path of travel of cartons C3 so that when the row of cartons C3 fails to reach said switch 32 the circuit will automatically be opened and solenoid 22 will be deenergized to leave the monitorizing mechanism 20 in the same condition as if conveyor A were fully supplied with spaced apart cartons C3 and preventing further transferring of said cartons C3 through slideway 17.

It is thus therefore seen that there is provided an improved conveyor and transfer system and monitorized control in which the objects of the invention are achieved and which are well adapted to meet all conditions of practical use.

As various possible embodiments may be made in the above invention for use for different purposes and as various changes might be made in the embodiments and method above set forth, it is understood that all the above matters here set forth or shown in the accompanying drawing are to be interpreted as illustrative and not in a limiting sense.

I claim:

1. In an article transferring system for packaging of the character described comprising conveyor means for moving setup abutting receptacles in one direction, a slideway terminating a leading end of said conveyor means positioned to extend transverse said direction forming a passage for individual receptacles from said conveyor means, a plurality of stations spaced apart from each other and from said slideway, an endless continuously moving horizontally disposed load carrying conveyor communicating with said slideway for receiving said receptacles through said passage for transportation in a continuous horizontal circuitous path past said spaced apart stations to provide a continuous line of substantially equally spaced receptacles moving at a constant speed past each of said spaced stations for selective removal as required and for recirculating the remaining receptacles, and a monitorized mechanism including pusher means intermittently actuated for moving said individual receptacles from said conveyor means to the endless horizontally disposed conveyor through said slideway in timed relation to replace receptacles selectively removed at said stations while the endless conveyor is continuously moving past said slideway.

2. The article transferring system defined in claim 1, in which said monitorized mechanism has a one revolution type of clutch to provide the intermittent actuation of said pusher means.

3. In an article transferring system for packaging of the character described comprising conveyor means for moving setup abutting receptacles in one direction, a slideway terminating a leading end of said conveyor means positioned to extend transverse said direction forming a passage for individual receptacles from said conveyor means, a plurality of stations spaced apart from each other and from said slideway, an endless continuously moving horizontally disposed load carrying conveyor communicating with said slideway for receiving said receptacles through said passage for transportation in a continuous horizontal circuitous path past said spaced apart stations to provide a continuous line of substantially equally spaced receptacles moving at a constant speed past each of said spaced stations for selective removal as required and for recirculating the remaining receptacles, and a monitorized mechanism including pusher means intermittently actuated for moving said individual receptacles from said conveyor means to the endless horizontally disposed conveyor through said slideway, and photo-electric means for regulating said intermittent actuation by said pusher means to correspond to spaces formed by said selective removal at said stations between the recirculating receptacles while the endless conveyor is continuously moving past said slideway.

4. The article transferring system defined in claim 3, in which said photo-electric means connects in circuit with an electric switch means located in the path of movement of said abutting receptacles on said conveyor means for opening said circuit on failure of a predetermined number of said receptacles in abutment to reach said leading end along said conveyor means.

5. The article transferring system defined in claim 3, in which said photo-electric means connects in circuit with an electric switch means located in the path of movement of said abutting receptacles on said conveyor means for opening said circuit on failure of a predetermined number of said receptacles in abutment to reach said leading end along said conveyor means, and a single revolution type of clutch forming part of said monitorizing means to provide for the intermittent actuation of said pusher means.

6. In an article transferring system for packaging of the character described comprising conveyor means for moving setup abutting receptacles in one direction, a slideway terminating a leading end of said conveyor means positioned to extend transverse said direction forming a passage for individual receptacles from said conveyor means, a plurality of stations spaced apart from each other and from said slideway, an endless continuously moving horizontally disposed load carrying conveyor communicating with said slideway for receiving said receptacles through said passage for transportation in a continuous horizontal circuitous path past said spaced apart stations to provide a continuous line of substantially equally spaced receptacles moving at a constant speed past each of said spaced stations for selective removal as required and for recirculating the remaining receptacles, transfer means for moving said receptacles through said passage individually from said conveyor means onto the endless horizontally disposed conveyor, and clutch controlled means for intermittently operating said transfer means to replace each receptacle after removal thereof at one of said stations from said endless horizontally disposed conveyor from said abutting receptacles carried on the conveyor means.

References Cited in the file of this patent

UNITED STATES PATENTS

| | | |
|---|---|---|
| 1,313,974 | Anderson | Aug. 26, 1919 |
| 1,626,492 | Youngson | Apr. 26, 1927 |
| 1,881,895 | Olson | Oct. 11, 1932 |
| 1,895,046 | Morgan | Jan. 24, 1933 |
| 2,051,105 | Roberts | Aug. 18, 1936 |
| 2,293,498 | First et al. | Aug. 18, 1942 |
| 2,304,447 | Feusier | Dec. 8, 1942 |
| 2,315,670 | Tasher et al. | Apr. 6, 1943 |
| 2,380,172 | Harber | July 10, 1945 |